United States Patent
Sakurai

(10) Patent No.: US 10,007,871 B2
(45) Date of Patent: Jun. 26, 2018

(54) IMAGE PROCESSING APPARATUS, IMAGE PROCESSING METHOD, AND STORAGE MEDIUM THAT CONVERTS DRAWING DATA GENERATED BY AN APPLICATION PROGRAM INTO PRINT DATA TO BE PRINTED

(71) Applicant: CANON KABUSHIKI KAISHA, Tokyo (JP)

(72) Inventor: Masakatsu Sakurai, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days. days.

(21) Appl. No.: 15/235,299

(22) Filed: Aug. 12, 2016

(65) Prior Publication Data

US 2017/0053197 A1 Feb. 23, 2017

(30) Foreign Application Priority Data

Aug. 21, 2015 (JP) .................. 2015-163846

(51) Int. Cl.
| | | |
|---|---|---|
| G06K 15/00 | (2006.01) | |
| G06K 15/02 | (2006.01) | |
| H04N 1/60 | (2006.01) | |
| G06T 7/00 | (2017.01) | |

(52) U.S. Cl.
CPC ..... *G06K 15/1852* (2013.01); *G06K 15/1802* (2013.01); *G06T 7/00* (2013.01); *H04N 1/60* (2013.01); *H04N 1/6072* (2013.01)

(58) Field of Classification Search
None
See application file for complete search history.

(56) References Cited

U.S. PATENT DOCUMENTS

| | | |
|---|---|---|
| 5,557,416 A | 9/1996 | Sasanuma et al. |
| 5,719,681 A | 2/1998 | Sasanuma et al. |
| 8,284,451 B2 | 10/2012 | Misawa et al. |
| 2011/0188057 A1 | 8/2011 | Sakurai |

FOREIGN PATENT DOCUMENTS

JP 2009-272889 A 11/2009

*Primary Examiner* — Barbara Reinier
(74) *Attorney, Agent, or Firm* — Fitzpatrick, Cella, Harper & Scinto

(57) ABSTRACT

An image processing apparatus that converts drawing data generated by an application program into print data to be used for printing with a printing apparatus. A memory stores a program. The program determines, among drawing elements included in the drawing data, a drawing element that has a graphics attribute and that corresponds to a character drawn with path coordinates. The program generates the print data by converting the drawing data and includes performing image processing suitable to a text attribute for the drawing element having the graphics attribute determined to correspond to the character drawn with the path coordinates. The program also sends the generated print data to the printing apparatus for the printing.

12 Claims, 12 Drawing Sheets

| ATTRIBUTE | KIND OF DITHER | RENDERING INTENT |
|---|---|---|
| TEXT | PRIORITY TO RESOLUTION | PRIORITY TO SATURATION (Saturation) |
| GRAPHICS | PRIORITY TO GRADATION | OVERALL COMPRESSION (Perceptual) |
| OTHERS | PRIORITY TO GRADATION | OVERALL COMPRESSION (Perceptual) |

FIG.1

```
<FixedPage Width= "793.76" Height= "1122.56" xmlns= "http://schemas.microsoft.com/xps/2005/06" xml:lang= "und" >
<!--Microsoft XPS Document Converter (MXDC)  Generated! Version:0.3.7601.17514-->
```

200

201
```
<Glyphs Fill= "#ffff0000" FontUri= "/Documents/1/Resources/Fonts/23F901F7-AAB7-40DE-8032-130EF4088117.odttf"
FontRenderingEmSize= "48.0019" StyleSimulations= "None" OriginX= "113.6" OriginY= "185.6" Indices= "74;75" UnicodeString= "gh" />
```

202
```
<Path Data= "F1 M 0,0 L 4.32,0 4.32,-5.76 0,-5.76 0,0 z
M 0,26.08 L 4.32,26.08 4.32,5.12 0,5.12 0.26.08 z"  RenderTransform= "1,0,0,1,188.8,158.88" Fill= "#ffff0000" />
```

203
```
<Path Data= "F1 M 0,0 L 4.32,0 4.32,-5.76 0,-5.76 0,0 z
M 0,27.52 C 0,28.8 -0.64,29.44 -1.76,29.44 L -4.96,29.44 -4.96,33.12
C 0.8,33.12 1.92,32.64 2.88,31.84 3.84,30.72 4.32,29.44 4.32,27.84 L 4.32,5.12
0,5.12 0,27.52 z"  RenderTransform= "1,0,0,1,236.96,158.88" />
```

204
```
<Glyphs Fill= "#ffff0000" FontUri= "/Documents/1/Resources/Fonts/23F901F7-AAB7-40DE-8032-130EF4088117.odttf"
FontRenderingEmSize= "48.0019" StyleSimulations= "None" OriginX= "262.88" OriginY= "185.6" Indices= "78;79" UnicodeString= "kl" />
```

205
```
<Path Data= "F1 M 275.68,136.64 L 269.92,126.88 264.32,136.64 275.68,136.64 z"  Fill= "#ffff0000" />
</FixedPage>
```

FIG.2

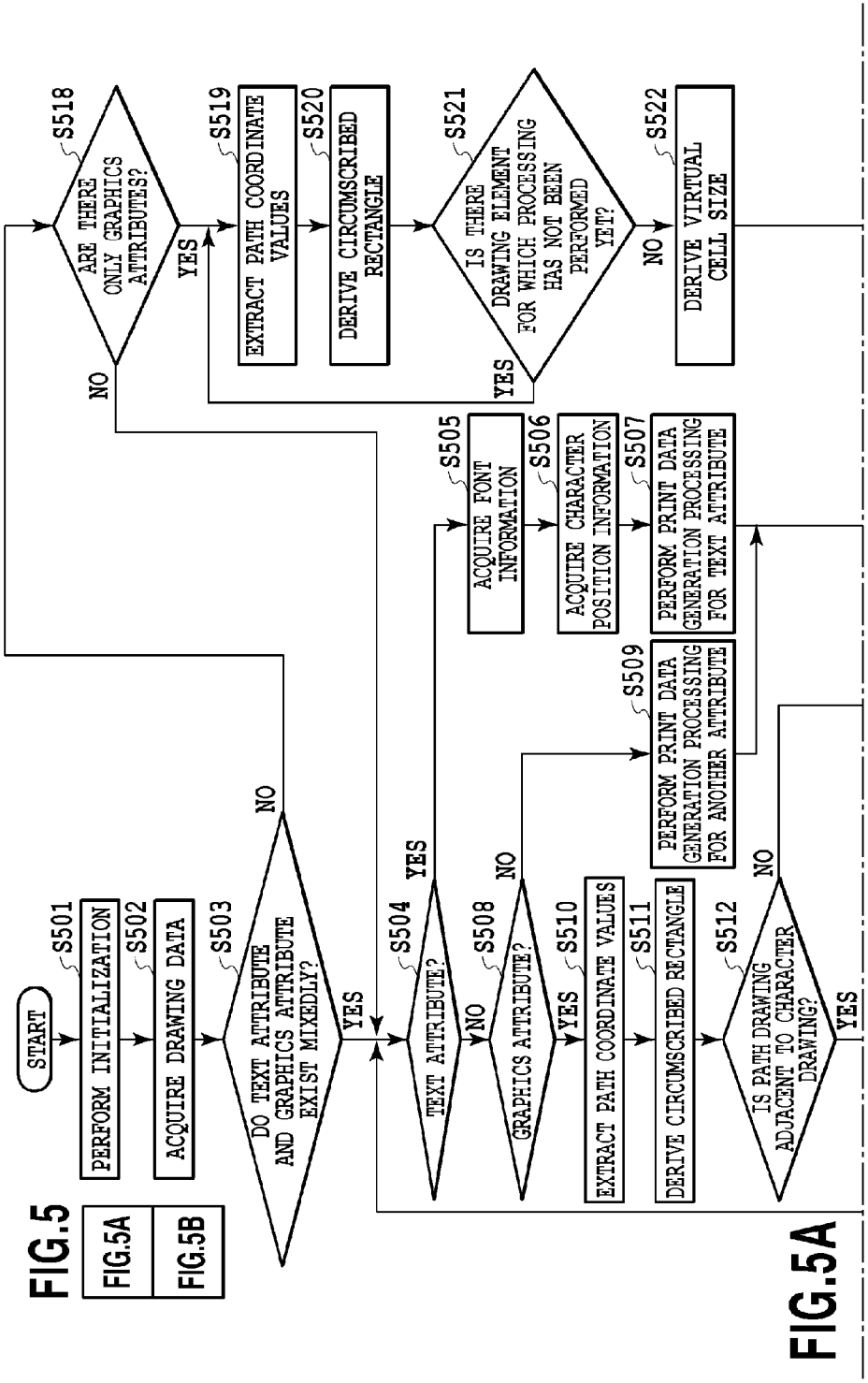

```
<FixedPage Width= "793.76" Height= "1122.56" xmlns= "http://schemas.microsoft.com/xps/2005/06" xml:lang= "und">    200
<!-- Microsoft XPS Document Converter (MXDC) Generated! Version:0.3.7601.17514-->
```

```
<Path Data= "F1 M 0,0 L 11.84,0 11.84,-3.68 -25.92,-3.68 -25.92,0 -14.08,0 -14.08,7.52
    -23.84,7.52 -23.84,24.32 -20.24,32 -20,22.88 -14.08,22.88 -14.08,31.84 -28,31.84
    -28,35.36 14.4,35.36 14.4,31.84 0,31.84 0,22.88 5.92,22.88 5.92,24.16
    9.76,24.16 9.76,7.52 0,7.52 0,0 z
    M -10.4,31.84 L -10.4,22.88 -3.68,22.88 -3.68,31.84 -10.4,31.84 z
    M 5.92,11.04 L 5.92,19.2 0,19.2 0,11.04 5.92,11.04 z
    M -3.68,11.04 L -3.68,19.2 -10.4,19.2 -10.4,11.04 -3.68,11.04 z
    M -14.08,11.04 L -14.08,19.2 -20,19.2 -20,11.04 -14.08,11.04 z
    M -10.4,0 L -3.68,0 -3.68,7.52 -10.4,7.52 -10.4,0 z"  RenderTransform= "1,0,0,1,144.48,152.64" Fill= "#ffff0000" />
```   1101

```
<Path Data= "F1 M 0,0 C 0.96,-0.16 1.12,-0.48 0.64,-0.96 L -3.04,-3.04 C -4.8,0.64 -6.56,3.84 -8,6.4
    L -9.92,5.28 -12,8.32 C -9.92,9.44 -7.52,11.2 -5.12,13.6 L -7.52,16.64 -12.8,16.8
    -12.16,20.32 C -11.84,21.6 -11.52,21.76 -10.88,20.64 L -3.52,19.84 -3.52,40.32 0.16,40.32
    0.16,19.52 4.64,19.04 C 5.12,20 5.44,21.12 5.76,22.08 L 8.96,20.16 8.96,39.2
    12.8,39.2 12.8,36.96 25.92,36.96 25.92,38.72 29.6,38.72 29.6,1.12 8.96,1.12
    8.96,19.68 C 8,16.8 6.56,14.08 4.64,11.84 L 1.76,13.28 C 2.56,14.56 3.2,15.52 3.52,16.32
    L -3.36,16.64 C -0.48,13.12 2.4,9.44 5.44,5.44 6.4,5.28 6.56,4.96 6.08,4.48
    L 2.72,2.4 C 0.32,6.24 -1.6,8.96 -2.72,10.72 L -5.6,8.16 C -3.68,5.44 -1.92,2.72 0,0
    L 0,0 z
    M 7.84,32.64 C 7.2,28.96 6.24,25.76 4.96,23.2 L 1.28,24.32 C 2.4,26.88 3.36,30.08 4,33.92
    L 7.84,32.64 z
    M -7.84,36.48 C -6.72,31.84 -6.08,28 -5.92,25.12 -5.12,24.48 -4.96,24 -5.44,24
    L -9.76,23.2 C -9.92,26.88 -10.72,30.72 -11.84,35.04 L -7.84,36.48 z
    M 17.6,4.64 L 17.6,16.96 12.8,16.96 12.8,4.64 17.6,4.64 z
    M 25.92,4.64 L 25.92,16.96 20.8,16.96 20.8,4.64 25.92,4.64 z
    M 25.92,20.64 L 25.92,33.28 20.8,33.28 20.8,20.64 25.92,20.64 z
    M 17.6,20.64 L 17.6,33.28 12.8,33.28 12.8,20.64 17.6,20.64 z"  RenderTransform= "1,0,0,1,176.32,149.44" Fill= "#ffff0000" />
```   1102

```
<Path Data= "F1 M 0,0 L 11.84,0 11.84,-3.68 -25.92,-3.68 -25.92,0 -14.08,0 -14.08,7.52
    -23.84,7.52 -23.84,24.32 -20.16,24.32 -20.16,22.88 -14.08,22.88 -14.08,31.84 -28,31.84
    -28,35.36 14.4,35.36 14.4,31.84 0,31.84 0,22.88 5.92,22.88 5.92,24.16
    9.76,24.16 9.76,7.52 0,7.52 0,0 z
    M -10.4,31.84 L -10.4,22.88 -3.84,22.88 -3.84,31.84 -10.4,31.84 z
    M 5.92,11.04 L 5.92,19.2 0,19.2 0,11.04 5.92,11.04 z
    M -3.84,11.04 L -3.84,19.2 -10.4,19.2 -10.4,11.04 -3.84,11.04 z
    M -14.08,11.04 L -14.08,19.2 -20.16,19.2 -20.16,11.04 -14.08,11.04 z
    M -10.4,0 L -3.84,0 -3.84,7.52 -10.4,7.52 -10.4,0 z"  RenderTransform= "1,0,0,1,240.48,152.64" Fill= "#ffff0000"
```   1103

```
</FixedPage>
```

FIG.11

IMAGE PROCESSING APPARATUS, IMAGE PROCESSING METHOD, AND STORAGE MEDIUM THAT CONVERTS DRAWING DATA GENERATED BY AN APPLICATION PROGRAM INTO PRINT DATA TO BE PRINTED

CLAIM OF PRIORITY

This application claims the benefit of Japanese Patent Application No. 2015-163846, filed Aug. 21, 2015, which is hereby incorporated by reference herein in its entirety.

BACKGROUND OF THE INVENTION

Field of the Invention

The present invention relates to an image processing technique to convert input drawing data into print data in a form that can be output by a printer.

Description of the Related Art

In a case when printing is performed from an application in an operating system (OS), such as Windows (registered trademark), print data is sent to a printer from a printer driver, and then printing is performed. At this time, the printer driver receives drawing data (e.g., in the form of XPS or GDI) from the application, and converts the drawing data into print data (e.g., data described in a page description language (PDL)) in a form that can be processed by the printer. In order to perform printing of higher quality, the printer driver classifies objects included in the drawing data from the application according to attribute, such as text, graphics, and image, and performs conversion processing by using optimum image processing in accordance with each attribute.

FIG. 1 is an example of a table specifying image processing in accordance with the attribute of an object, and the optimum kind of dither used for binarization, and the optimum rendering intent used for color matching are associated with each attribute. In the example shown in FIG. 1, for the text attribute, Priority to resolution is specified for the kind of dither and Priority to saturation is specified for the rendering intent, and for the graphics attribute and other attributes (image, or the like), Priority to gradation is specified for the kind of dither and Overall compression is specified for the rendering intent. Due to this, it is possible to print a character clearer, and to generate graphics and an image smoother.

Further, drawing data from a general application is described by font information and character code for the text attribute, by path coordinate values representing a shape and a drawing method for the graphics attribute, and by a size and color information on each pixel for the image attribute. Because of this, it is possible to easily identify the attribute based on the form of a description. However, depending on the application, there may be a case when, while a one-byte character is described by drawing data with the text attribute, a two-byte character is described by drawing data with the graphics attribute, including coordinate values in the form of path and fill instructions. In the case when the attribute determination based on the form of a description, as described above, is performed for the drawing data describing characters with both the text attribute and the graphics attribute, the character described in the form of path is recognized as graphics, and not a text.

FIG. 2 is an example of drawing data input to a printer driver from an application, and the drawing data is described in the form of XPS. The form of XPS as a form of drawing data is merely an example, and other forms, such as the form of GDI, may be accepted. A frame 201 of drawing data 200 corresponding to one page shown in FIG. 2 indicates data with the text attribute described so that the alphabet "gh", which is each a one-byte character, is drawn in "red" by using specified font data. A frame 202 indicates data in the form of a path (graphics attribute) described, so that the alphabet "i", which is a two-byte character, is represented by path coordinate values, and the portion indicated by the path is filled in "red" and drawn as graphics. Similarly, a frame 203 indicates data in the form of a path described so that the alphabet "j", which is a two-byte character, is filled in "red" and drawn as graphics. A frame 204 indicates data with the text attribute described so that, as in the frame 201, the alphabet "kl", which is each a one-byte character, is drawn in "red" by using specified font data. A frame 205 indicates data in the form of a path described so that a triangle is drawn in "red".

FIG. 3 shows the results of performing the attribute determination based on the form of the description described above and performing printing by performing image processing in accordance with each attribute of the determination results for the drawing data shown in FIG. 2, in which one-byte characters and two-byte characters exist mixedly. For one-byte characters within a frame 301 and a frame 303, the image processing is performed by treating them as the text attribute, and then, the printing processing is performed and for two-byte characters within a frame 302, the image processing is performed by treating them as the graphics attribute, and then, the printing processing is performed. Despite that the same color is specified, different kinds of image processing are performed, and therefore, the densities of the characters appear different. As described above, even though the same color is specified, there is a case when the tints of the drawing results are different on a condition that the attributes are different. Regarding this point, for example, Japanese Patent Laid-Open No. 2009-272889 has disclosed a technique, in the case when the attributes are different in the vector data within an area in which the same color is specified, to change one of the attributes into the other attribute so that the attributes become the same, in order to make the same the tint within the area.

The main object of the technique of Japanese Patent Laid-Open No. 2009-272889 is to make the tint of the portion of the illustration area described by vector data the same as that of the color of the periphery of the illustration area. Consequently, it is not possible to deal with the difference in tint that occurs due to characters being described with different kinds of attribute.

SUMMARY OF THE INVENTION

The image processing apparatus according to the present invention is an image processing apparatus that converts drawing data generated by an application into print data in a form that can be output by a printing apparatus, and includes a determination unit configured to determine a drawing element, among drawing elements included in the drawing data, which is a drawing element with the graphics attribute and which corresponds to a character the drawing of which is specified by path coordinates, and an image processing unit configured to generate the print data by performing predetermined image processing for the drawing element included in the drawing data, wherein the image processing unit performs image processing suitable to a drawing element with the text attribute for the drawing element with the graphics attribute determined to be the drawing element corresponding to a character by the determination unit Further features of the present invention will become apparent from the following description of exemplary embodiments (with reference to the attached drawings).

BRIEF DESCRIPTION OF THE DRAWINGS

FIG. 1 is a diagram showing an example of a table specifying image processing in accordance with the attribute of an object;

FIG. 2 is a diagram showing an example of drawing data input to a printer driver from an application;

FIG. 5 is a diagram showing the relationship between FIGS. 5A and 5B;

FIGS. 5A and 5B are flowcharts showing a flow of processing to convert drawing data generated by an application into print data for a printer;

FIG. 11 is a diagram showing an example of drawing data in the form of XPS specifying path drawing of three kanji characters.

DESCRIPTION OF THE EMBODIMENTS

Hereafter, with reference to the attached drawings, the present invention is explained in detail in accordance with preferred embodiments. Configurations shown in the following embodiments are merely exemplary, and the present invention is not limited to the configurations shown schematically.

First Embodiment

Figure 3:
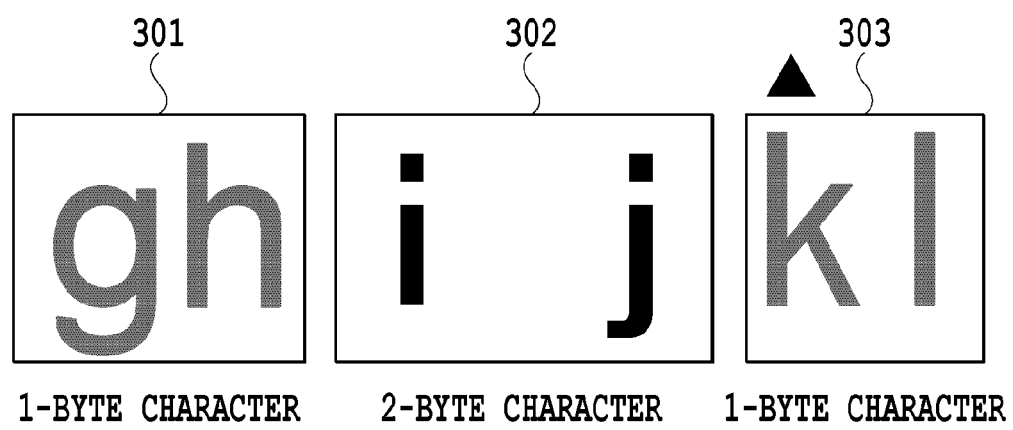
FIG. 3 is a diagram showing the results of performing printing by performing image processing in accordance with each attribute.
Figure 4:
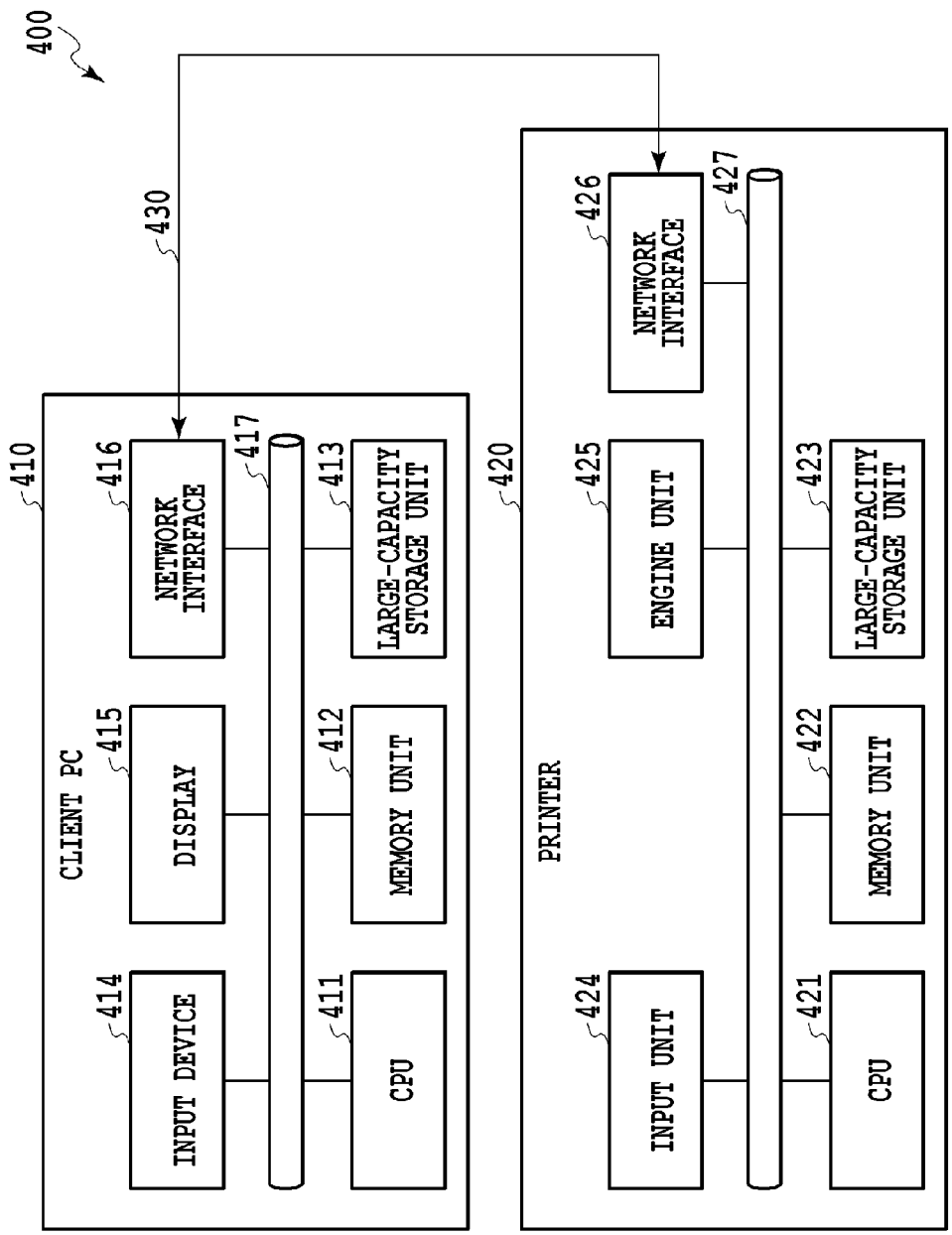
FIG. 4 is a diagram showing a configuration example of a printing system.

FIG. 4 is a diagram showing a configuration example of a printing system in which printing is performed by converting drawing data generated by an application into print data in a form that can be output by a printer. A printing system 400 shown in FIG. 4 has a configuration including a client PC 410 and a printer 420, both being connected by a network 430. The network 430 is, for example, a LAN, a WAN, etc.

The client PC 410 includes a CPU 411, a memory unit 412, a large-capacity storage unit 413, an input device 414, a display 415, and a network interface 416. The CPU 411 is an arithmetic device in charge of controlling the entire client PC 410. The network interface 416 is an interface for connecting the client PC 410 to the printer 420 or another device (not shown) via the network 430 and for performing transmission and reception of various kinds of data therewith. The memory unit 412 includes a RAM as a work area of the CPU 411 and a ROM for storing various programs. The large-capacity storage unit 413 includes, for example, a hard disk drive or a flash memory and is used to store an OS, programs, various kinds of data processed by an application, etc. The input device 414 is a keyboard, a mouse, etc., for a user to give various operation instructions, and the display 415 is, for example, a liquid crystal monitor, or the like, for producing various displays. Then, each unit described above is connected to one another via a bus 417.

In the client PC 410, a so-called printer driver performs processing to convert drawing data instructed to be printed by a user into print data (e.g., PDL data) compatible with the printer 420. That is, the printer driver functions as a data conversion unit. The print data converted from the drawing data by the printer driver is sent to the printer 420, and then, printed and output. Software (printer driver in the present embodiment) for implementing such conversion processing is stored in, for example, a computer readable medium including the above-described large-capacity storage unit 413, and the conversion processing is implemented by the software being loaded onto the RAM and executed by the CPU 411.

The printer 420 includes a CPU 421, a memory unit 422, a large-capacity storage unit 423, an input unit 424, an engine unit 425, and a network interface 426. The CPU 421 is an arithmetic device in charge of controlling the entire printer 420. The network interface 426 is an interface for connecting the printer 420 to the client PC 410 or another device (not shown) via the network 430 and for performing transmission and reception of various kinds of data therewith. The memory unit 422 includes a RAM as a work area of the CPU 421 and a ROM for storing various programs. The large-capacity storage unit 423 includes, for example, a hard disk drive or a flash memory, and is used to store an OS, programs, print data received from the client PC 410, etc. The input unit 424 includes a touch panel that also functions as a display for producing various displays, and buttons. The engine unit 425 performs printing and outputting on a printing medium, such as paper. Then, each unit described above is connected to one another via a bus 427.

Software that implements various kinds of operation/processing in the printer 420 is stored in, for example, a computer readable storage medium including the above-described large-capacity storage unit 423. The various kinds of operation/processing are implemented by the software being loaded onto the RAM from the computer readable storage medium and executed by the CPU 421.

Figure 5B:
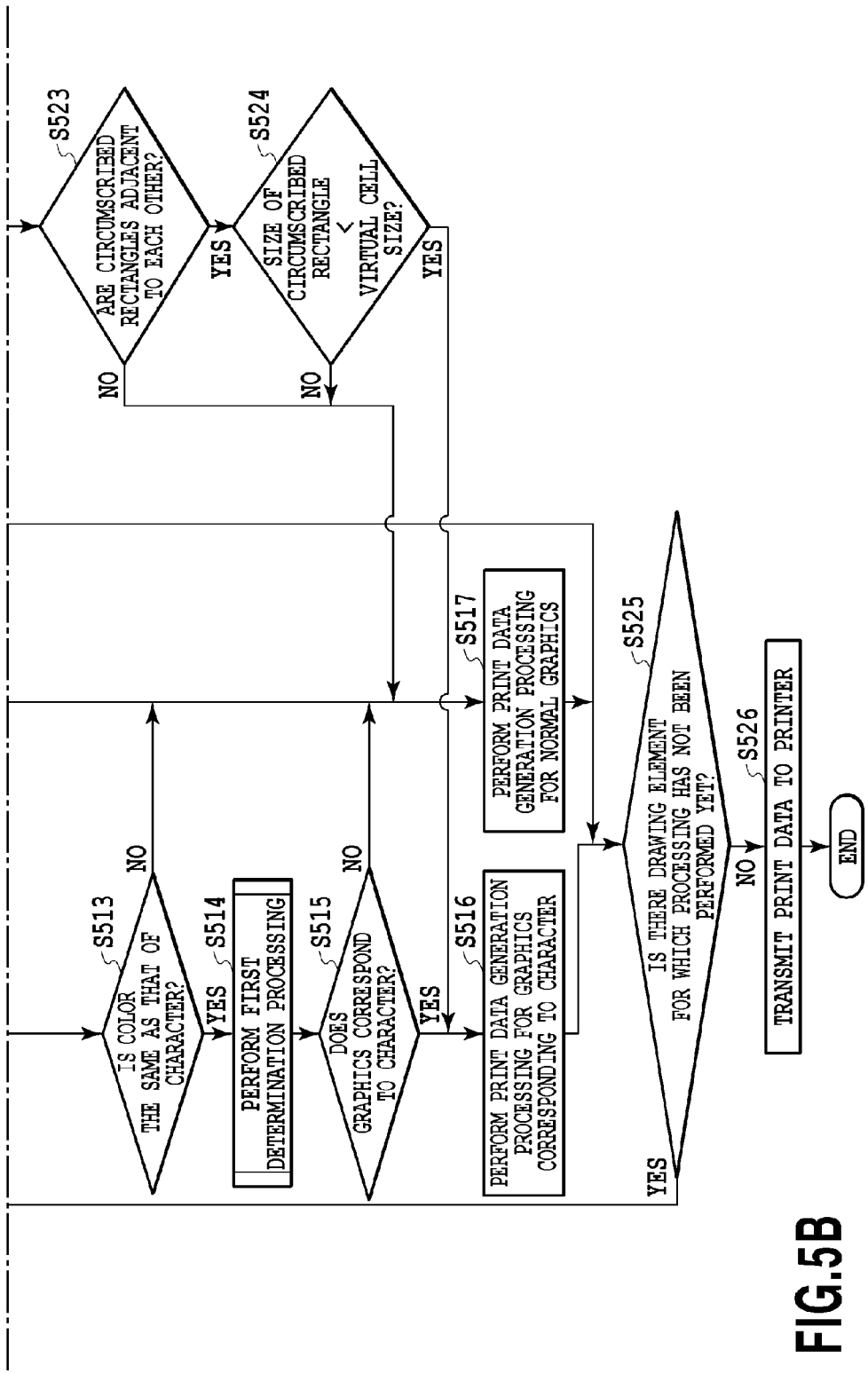

FIGS. 5A and 5B are flowcharts showing a flow of processing to convert drawing data generated by an application into print data for the printer 420. This conversion processing is implemented by software (typically, a printer driver) installed in the client PC 410.

At step 501, initialization of variables, or the like, to be used in the processing at each of the subsequent steps is performed.

At step 502, drawing data saved in the large-capacity storage unit 413 is acquired. This drawing data is generated by the OS on an application, such as Word, at the timing of instructions to perform printing given by a user, and is saved in the large-capacity storage unit 413. In the present embodiment, the following explanation is given by taking the case when drawing data in the form of XPS is acquired as an example.

At step 503, whether the text attribute and the graphics attribute exist mixedly in the drawing element included in the acquired drawing data is determined. In the drawing data 200 shown in FIG. 2, each of the frames 201 to 205 is one drawing element. In the case of the text attribute, character code and Glyph data are included in the drawing element. In the drawing data in the form of XPS shown in FIG. 2, in the case when the command that follows immediately after the tag "<" is "Glyphs Fill" as in the frame 201 or the frame 204, the drawing element is determined to have the text attribute. On the other hand, in the case of the graphics attribute, path coordinate values are included in the drawing element and the drawing is drawing (path drawing) to fill a closed area specified by the path coordinate values. In the drawing data in the form of XPS shown in FIG. 2, in the case when the command that follows immediately after the tag "<" is "Path Data" as in the frames 202, 203, and 205, the drawing is determined to be the path drawing. Based on the information such as this, whether both the text attribute and the graphics attribute exist within the drawing data is determined, and in the case when both the attributes exist mixedly, the processing proceeds to step 504. On the other hand, in the case when the text attribute and the graphics attribute do not exist mixedly, the processing proceeds to step 518.

At step 504, after determining an arbitrary drawing element within the drawing data to be a drawing element of interest, whether or not the drawing element of interest has the text attribute is determined. In the case when the results of the determination indicate the text attribute, the processing proceeds to step 505. On the other hand, in the case when the attribute is not the text attribute, the processing proceeds to step 508.

At step 505, character font information is acquired from the drawing element of interest with the text attribute. Here, the font information includes baseline position information and cell size information, in addition to the information indicating the font (Mincho, Gothic, etc.), and the character size (ten points, or the like). The cell size information is information specifying the cell size as the font calculated from the current character size and represented by the numbers of pixels corresponding to the cell width and the cell height. The baseline position information is information specifying the position of the baseline and is represented by the number of pixels corresponding to the distance from the upper end of the cell to the baseline.

Figure 6:
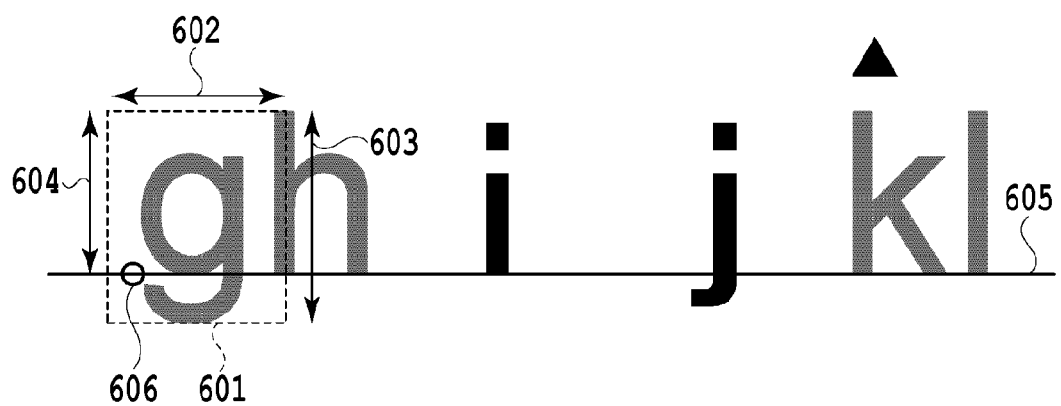
FIG. 6 is a diagram showing an example of a baseline specified by baseline position information and a cell specified by cell size information.

FIG. 6 is a diagram showing an example of a baseline specified by the baseline position information and a cell specified by the cell size information. In FIG. 6, a broken line rectangle 601 indicates a cell, an arrow 602 indicates a cell width, and an arrow 603 indicates a cell height. Further, in FIG. 6, a straight line 605 indicates a baseline and an arrow 604 indicates the distance from the upper end of the cell 601 to the baseline. The acquired font information is saved in the RAM, or the like.

At step 506, character position information is acquired from the drawing element of interest with the text attribute. Here, the character position information is information indicating the position on a sheet where a character should be formed by the X coordinate and the Y coordinate. In FIG. 6 described previously, a ○ mark 606 indicates the character position of the character string "gh", and "OriginX="113.6"" and "OriginY="185.6"" in the frame 201 in FIG. 2 are the character position information in this case. The acquired character position information is saved in the RAM, or the like.

At step 507, print data generation processing for the text attribute is performed for the drawing element of interest with the text attribute. The print data generation processing for the text attribute will be processing in which "Priority to resolution" is applied to the kind of dither in the dither processing and "Priority to saturation" is applied to the rendering intent in the color matching processing in accordance with the table in FIG. 1 described previously. The generated print data of the character drawing is saved in the RAM, or the like.

In the case when the attribute determination at step 504 determines that the drawing element of interest does not have the text attribute, then, whether or not the drawing element of interest has the graphics attribute is determined at step 508. In the case when the results of the determination indicate the graphics attribute, the processing proceeds to step 510. On the other hand, in the case when the attribute is the image attribute, or the like, other than the graphics attribute, the processing proceeds to step 509, and the print data generation processing for another attribute is performed for the drawing element of interest. The print data generation processing for another attribute will be processing in which "Priority to gradation" is applied to the kind of dither and "Overall compression" is applied to the rendering intent in accordance with the table in FIG. 1 described previously. The generated print data of the image drawing, or the like, is saved in the RAM, or the like.

Figure 7:
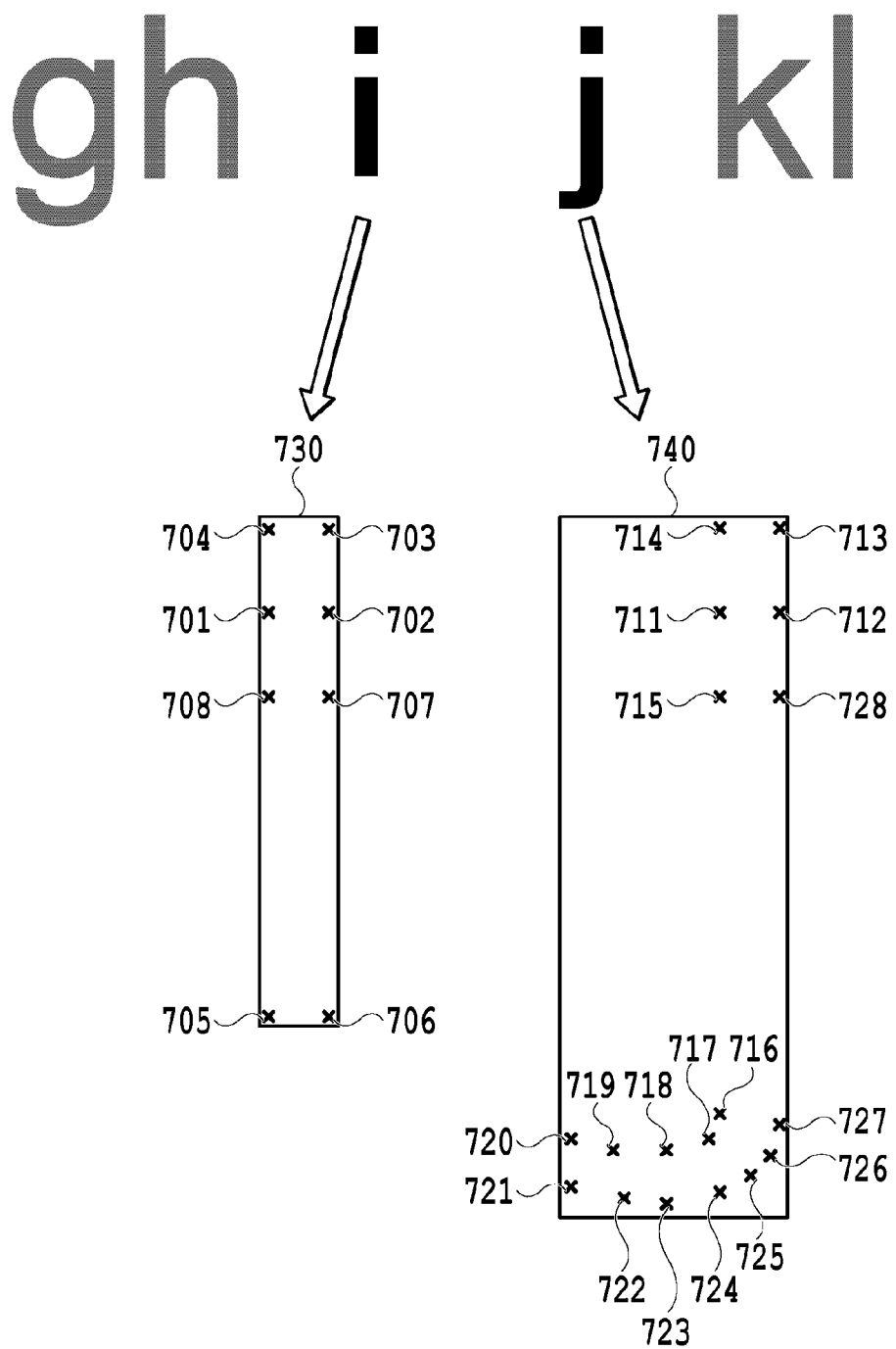
FIG. 7 is a diagram showing each position specified by path coordinate values in the case when a drawing element has the graphics attribute.

At step 510, the path coordinate values are extracted from the drawing element of interest with the graphics attribute. In the case when the drawing element shown in the frame 202 or 203 in FIG. 2 is the drawing element of interest, the path coordinate values are extracted by coordinate-converting the information taken out from the description portion of "Path Data" by using the information taken out from the description portion of "Render Transform". FIG. 7 is a diagram showing each position specified by the path coordinate values in the case when the drawing element has the graphics attribute. The path coordinate values are represented by the x-coordinate value and the y-coordinate value and, at this step, the path coordinate values corresponding to each x mark as described in FIG. 7 are extracted. In FIG. 7, each position specified by the path coordinate values of the two-byte character "i" is indicated by each of x marks 701 to 708 and each position specified by the path coordinate values of the two-byte character "j" is indicated by each of x marks 711 to 728. For example, the path coordinate values corresponding to the x mark 705 are (0, 26.08)×(188.8, 158.88)=(188.8, 184.96).

At step 511, a circumscribed rectangle is derived based on the path coordinate values extracted at step 510. In FIG. 7, a frame 730 indicates the circumscribed rectangle derived for the two-byte character "i" and a frame 740 indicates the circumscribed rectangle derived for the two-byte character "j". The information on the derived circumscribed rectangle (e.g., information on coordinates including x-coordinates and y-coordinates specifying the four corners of the circumscribed rectangle) is saved in the RAM, or the like.

At step 512, whether the drawing elements located before and after the drawing element of interest with the graphics attribute have the text attribute (whether the path drawing and the character drawing are adjacent to each other) is determined. Specifically, in the case when, for example, the drawing element of interest has the graphics attribute of the frame 202 and one of the drawing elements 201 and 203 located before and after the drawing element of interest is the drawing element with the text attribute, it is determined that the path drawing and the character drawing are adjacent to each other. In the case when the results of the determination indicate that the path drawing and the character drawing are adjacent to each other, the processing proceeds to step 513. On the other hand, in the case when the path drawing and the character drawing are not adjacent to each other in the drawing order, the processing proceeds to step 517.

At step 513, the color of the graphics relating to the path drawing, which is the drawing element of interest, and the color of the character, relating to the character drawing determined to be adjacent to the path drawing in the drawing order are the same, is determined. In the case of the drawing data in the form of XPS shown in FIG. 2, on a condition that the color specified by "Glyphs Fill" of the character drawing and the color specified by "Fill" of the path drawing are the same, it is determined that both colors are the same. In the case when the results of the determination indicate that the color of the graphics relating to the path drawing and the color of the character relating to the character drawing adjacent to the path drawing are the same, the processing proceeds to step 514. On the other hand, in the case when the color of the graphics relating to the path drawing and the color of the character relating to the character drawing adjacent to the path drawing are not the same, the processing proceeds to step 517.

Figure 8:
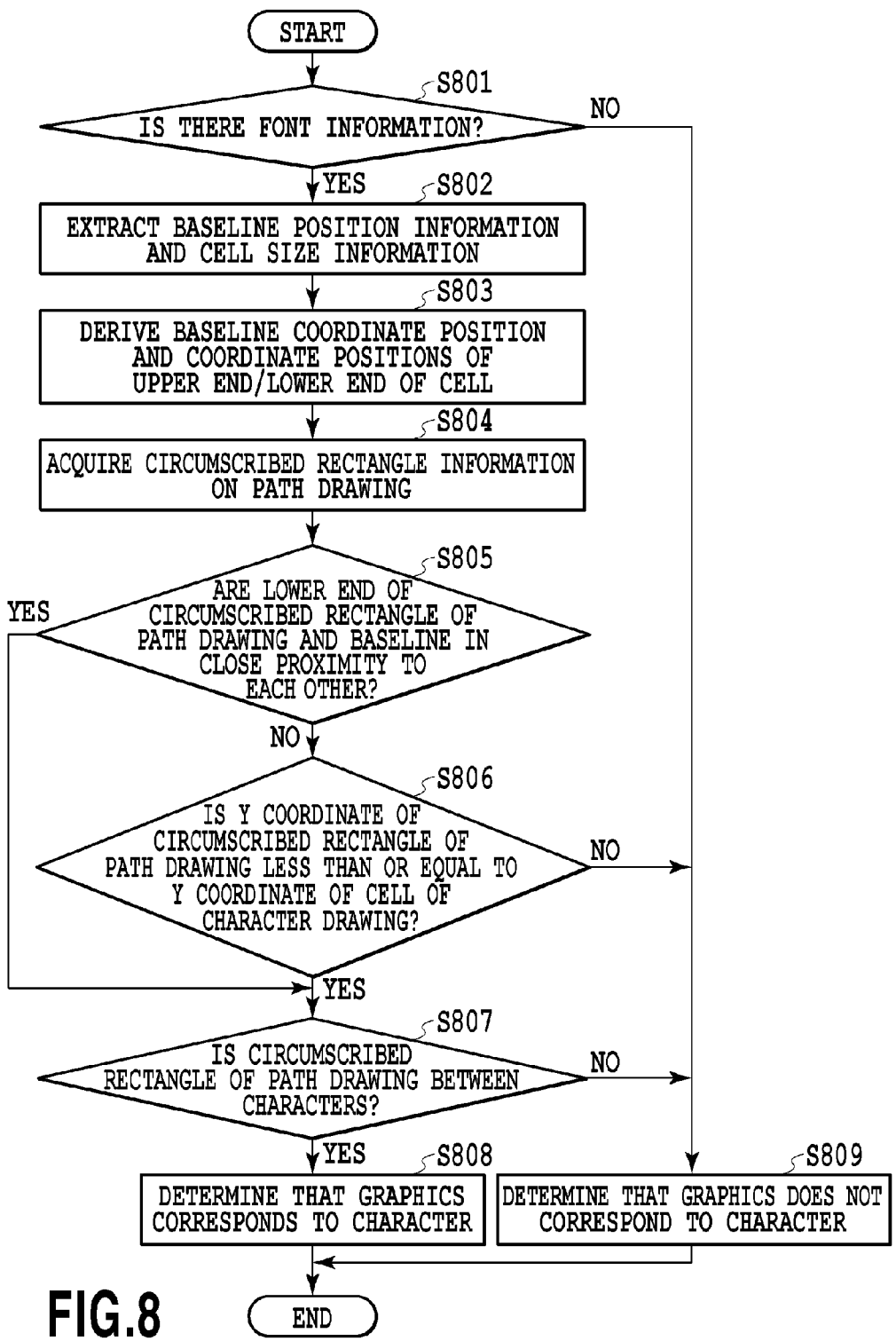
FIG. 8 is a flowchart showing a flow of first determination processing.

At step 514, processing (hereafter, first determination processing) to determine whether the graphics relating to the path drawing is graphics corresponding to a character is performed. FIG. 8 is a flowchart showing a flow of the first determination processing. Hereafter, a detailed explanation is given.

At step 801, whether or not the font information on the character drawing is acquired and saved in the RAM, or the like, is determined. In the case when the font information is saved, the processing proceeds to step 802. In the case when the font information is not acquired yet and not saved, the processing proceeds to step 809.

At step 802, from the saved font information, the baseline position information and the cell size information are extracted.

At step 803, based on the extracted baseline position information and the cell size information, the coordinate position of the baseline and the coordinate positions of the upper end/lower end of the cell in the print coordinate system are derived. The baseline coordinate position corresponds to OriginY of the character position information (OriginX, OriginY) included in the font information on the character drawing. The coordinate positions of the upper end/lower end of the cell may be determined by calculating the cell size corresponding to the character size in the print coordinate system from the cell size information, and by determining the position of the upper end and the position of the lower end of the cell, respectively, from the relationship between the calculated cell size and the above-described character position.

At step 804, circumscribed rectangle information on the path drawing derived/saved at step S511 described previously is acquired.

At step 805, whether the baseline specified by the baseline coordinate position (here, OriginY) derived at step 803 and a predetermined side (here, lower end) of the circumscribed rectangle specified by the circumscribed rectangle information acquired at step 804 are in close proximity to each other is determined. Whether both are in close proximity to each other may be determined by determining whether the distance between both is less than or equal to a predetermined threshold value (e.g., less than or equal to a distance ⅒ of the cell height of the character drawing).

Figure 9:
FIG. 9 is a diagram showing a mutual positional relationship between a baseline and a cell of character drawing, and a circumscribed rectangle of path drawing.

FIG. 9 is a diagram showing a mutual positional relationship between the baseline and the cell of the character drawing, and the circumscribed rectangle of the path drawing in the drawing data shown in FIG. 2. In FIG. 9, a frame 901 shows a circumscribed rectangle of the alphabet "i", which is a two-byte character, a frame 902 similarly shows a circumscribed rectangle of the alphabet "j", which is a two-byte character, and a frame 903 shows a circumscribed rectangle of a black triangle, which is graphics. In this case, for example, the lower end position of the circumscribed rectangle 901 is in contact with the baseline, and, therefore, it is determined that both are in close proximity to each other. On the other hand, the lower end position of the circumscribed rectangle 903 is distant from the baseline, and, therefore, it is determined that both are not in close proximity to each other. In the case when it is determined that the lower end position of the circumscribed rectangle of the path drawing and the baseline are in close proximity to each other in this manner, the processing proceeds to step 807. On the other hand, in the case when it is determined that the lower end position of the circumscribed rectangle of the path drawing and the baseline are not in close proximity to each other, the processing proceeds to step 806. In the case of vertical writing, it may be possible to perform a determination by determining whether a reference line at the time of drawing, which corresponds to the above-described baseline, and a corresponding line in a circumscribed rectangle are in close proximity to each other.

At step 806, whether or not the side corresponding to the height of the circumscribed rectangle is within the cell height range is determined. Specifically, whether or not the Y coordinate value specifying the height of the circumscribed rectangle of the path drawing is less than or equal to the Y coordinate value specifying the cell height of the character drawing is determined. In the case when the results of the determination indicate that the side corresponding to the height of the circumscribed rectangle is within the cell height range, the processing proceeds to step 807, and in the case when it is determined that the side corresponding to the height of the circumscribed rectangle is outside of the cell height range, the processing proceeds to step 809. For example, it is assumed that it has been determined that the distance between the lower end position of the circumscribed rectangle 902 shown in FIG. 9 and the baseline exceeds the threshold value, and that both are not in close proximity to each other (No at S805). As is obvious from FIG. 9, the side corresponding to the height of the circumscribed rectangle of the frame 902 is fit in the cell height of the cell 601, and, therefore, in this case, the processing proceeds to step 807, as a result.

At step 807, whether or not there is a circumscribed rectangle of the path drawing between characters relating to the character drawing is determined. For example, in the case when the order of characters is from left to right and when the path drawing is immediately after the character drawing, whether or not the X coordinate of the circumscribed rectangle of the path drawing is greater than the X coordinate of the character drawing position is checked, and in the case when the X coordinate of the circumscribed rectangle of the path drawing is greater, it is determined that the circumscribed rectangle of the path drawing is between the characters. Further, in the case when the character drawing is immediately after the path drawing, whether or not the X coordinate of the circumscribed rectangle of the path drawing is smaller than the X coordinate of the character drawing position is checked, and in the case when the X coordinate of the circumscribed rectangle of the path drawing is smaller, it is determined that the circumscribed rectangle of the path drawing is between the characters. For characters in the case of vertical writing in place of horizontal writing, it is sufficient to compare the magnitudes of the Y coordinates, in place of comparing the magnitudes of the X coordinates. In the case when the results of the determination such as this indicate that the position of the circumscribed rectangle of the path drawing is between the characters relating to the character drawing, the processing proceeds to step 808. On the other hand, in the case when the position of the circumscribed rectangle of the path drawing is not between the characters relating to the character drawing, the processing proceeds to step 809.

At step 808, it is determined that the graphics relating to the path drawing, which is the drawing element of interest, is graphics corresponding to a character.

At step 809, it is determined that the graphics relating to the path drawing, which is the drawing element of interest, is not graphics corresponding to a character (normal graphics).

The above is the contents of the first determination processing. In the present embodiment, in the case when it is determined that the baseline and the predetermined side of the circumscribed rectangle are not in close proximity to each other by the determination (S805) based on the distance from the baseline, whether or not the side corresponding to the height of the circumscribed rectangle is within the cell height range is determined (S806). Due to this, it is made possible to perform a determination of whether or not graphics is graphics corresponding to a character with a higher accuracy, but it may also be possible to perform only one of the determinations. It may also be possible to omit the determination processing at step 806 by, for example, increasing the margin of the threshold value in the determination based on the distance from the baseline. Alternatively, it may also be possible to omit the determination at step 805 based on the distance from the baseline. The explanation returns to the flowchart in FIGS. 5A and 5B.

At step 515, the print data generation processing for the path drawing branches in accordance with the results of the above-described first determination processing. In the case when it is determined that the graphics relating to the path drawing is graphics corresponding to a character in the first determination processing, the processing proceeds to step 516. On the other hand, in the case when it is determines that the graphics relating to the path drawing is not graphics corresponding to a character (normal graphics), the processing proceeds to step 517.

At step 516, print data generation processing for graphics corresponding to a character is performed for the drawing element of interest with the graphics attribute. This print data generation processing for graphics corresponding to a character will be print data generation processing optimum to drawing of a character, unlike the print data generation processing for normal graphics performed at the next step 517. That is, the processing will be processing suitable to the character drawing in which "Priority to resolution" is applied to the kind of dither and "Priority to saturation" to the rendering intent, as in the processing at step 507 described above. The generated print data of the path drawing corresponding to a character is saved in the RAM, or the like.

At step 517, the print data generation processing for normal graphics is performed for the drawing element of interest with the graphics attribute. The print data generation processing for normal graphics will be processing in which "Priority to gradation" is applied to the kind of dither and "Overall compression" to the rendering intent in accordance with the table in FIG. 1 described previously. The generated print data of the path drawing for normal graphics is saved in the RAM, or the like.

The processing up to this processing is the processing in the case when the text attribute and the graphics attribute exist mixedly within the drawing data corresponding to one page. Next, the processing in the case when the text attribute and the graphics attribute do no exist mixedly (No at step 503) is explained.

First, at step 518, whether the drawing elements included in the acquired drawing data consist of only the drawing elements with the graphics attribute is determined. In the case when the drawing elements consist of only the drawing elements with the graphics attribute, at the subsequent steps, i.e., step 519 to step 524, determination processing (second determination processing) is performed for a series of graphics relating to the path drawing with the graphics attribute. On the other hand, in the case when a drawing element other than that with the graphics attribute is also included, the processing proceeds to step 504, and the above-described processing is performed in accordance with the attribute of each drawing element. Hereafter, the second determination processing is explained.

At step 519, after an arbitrary drawing element with the graphics attribute within the drawing data is determined to be a drawing element of interest, path coordinate values are extracted from the drawing element of interest. The contents are the same as those at step 510 described above.

At step 520, a circumscribed rectangle is derived based on the path coordinate values extracted at step 519. The contents are the same as those at step 511 described above.

At step 521, whether or not there is a drawing element for which the processing has not been performed yet within the drawing data is determined. In the case when there is a drawing element for which the processing has not been performed yet, the processing returns to step 519, and the next drawing element is determined to be the drawing element of interest, and thus, the processing is continued. On the other hand, in the case when the processing has been completed for all of the drawing elements within the drawing data, the processing proceeds to step 522.

At step 522, a length (hereafter, virtual cell size) corresponding to the cell size of a character in each path drawing is derived. Specifically, circumscribed rectangle information on each path drawing extracted/saved at step 520 is acquired, an interval between reference positions in circumscribed rectangles in close proximity to each other is found, and the interval that is found is taken to be the length of one side of the virtual cell size. The reference position in this case is, for example, the left or right end, or the center.

Figure 10:
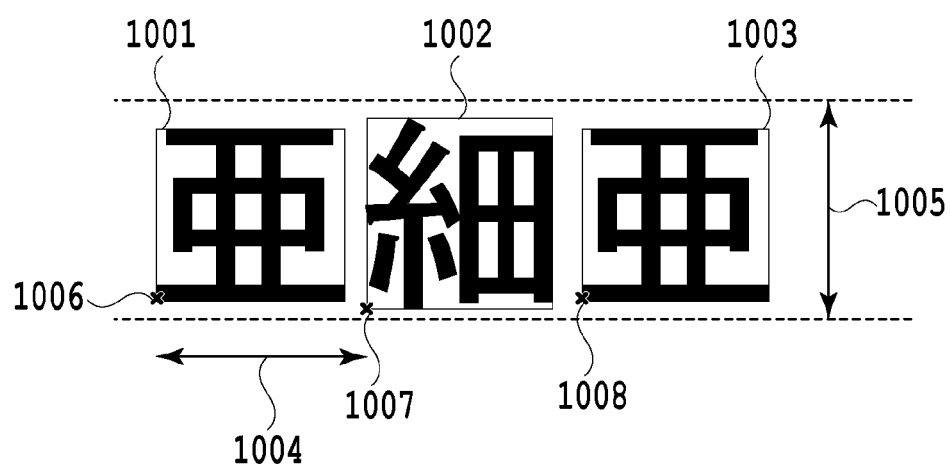
FIG. 10 is a diagram showing circumscribed rectangles of three kinds of path drawing corresponding to three kanji characters, each represented by a two-byte character.

FIG. 10 is a diagram showing circumscribed rectangles of three kinds of path drawing corresponding to three kanji characters, each of which is represented by a two-byte character, and each of circumscribed rectangles 1001 to 1003 is attached to each character. FIG. 11 shows drawing data in the form of XPS specifying the path drawing of the three kanji characters shown in FIG. 10. In drawing data 1100 corresponding to one page shown in FIG. 11, a frame 1101 shows data in the form of a path described so that the kanji, which is a two-byte character, is represented by path coordinate values and the portion indicated by the path is filled in "red" and drawn as graphics. Similarly, frames 1102 and 1103 also show data in the form of a path described so that the kanji, each of which is a two-byte character, are filled in "red" and drawn as graphics. Then, in FIG. 10, the interval between the left end of the circumscribed rectangle 1001 and the left end of the circumscribed rectangle 1002 is indicated by an arrow 1004. The interval between the reference positions (in the example in FIG. 10, the left ends) in the circumscribed rectangles in close proximity to each other in this manner is regarded as one side (the length of the arrow 1004 is the cell width, the length of an arrow 1005 having the same length as that of the arrow 1004 is the cell height) of the character, and thus, the virtual cell size is derived as a result.

At step 523, whether the circumscribed rectangles in close proximity to each other are located side by side is determined. Specifically, in the case when the order of characters is from left to right, on a condition that the X coordinates of the above-described reference positions (here, the left ends) in the circumscribed rectangles in close proximity to each other are in the ascending order, it is determined that the circumscribed rectangles are located side by side as a result.

In FIG. 10 described previously, an x mark 1006 indicates the X coordinate of the left end of the circumscribed rectangle 1001, an x mark 1007 indicates the X coordinate of the left end of the circumscribed rectangle 1002, and an x mark 1008 indicates the X coordinate of the left end of the circumscribed rectangle 1003, and it is known that the X coordinates are in an ascending order with the X coordinate of the left end of the circumscribed rectangle 1001 being the front. In the case when the order of characters is from right to left (although the order is the same both in the case when the order of characters is from left to right and in the case when the order of characters is from right to left in the present embodiment), it is sufficient to determine whether or not the order is descending. Further, for characters in the case of vertical writing in place of horizontal writing, it is sufficient to compare the Y coordinates of the upper end or the lower end in place of the X coordinates. In the case when it is determined that the circumscribed rectangles in close proximity to each other are located side by side, the processing proceeds to step 524. On the other hand, in the case when it is determined that the circumscribed rectangles in close proximity to each other are not located side by side, the processing proceeds to step 517 described previously, and the print data generation processing for normal graphics is performed.

At step 524, whether the size of each circumscribed rectangle of the path drawing is smaller than the virtual cell size derived at step 522 is determined. Specifically, for example, in the case when both of the Y coordinate of the upper end and the Y coordinate of the lower end of the circumscribed rectangle are within the range of the virtual cell size, it is determined that the size of the circumscribed rectangle is smaller than the virtual cell size.

In FIG. 10 described previously, the arrow 1005 indicates the cell height in the virtual cell size and the Y coordinates of the upper end and the lower end are fit within the cell indicated by the arrow 1005 in all of the three circumscribed rectangles 1001 to 1003. Consequently, in this case, it is determined that the size of the circumscribed rectangle is smaller than the virtual cell size. At the time of the determination, it may also be possible to perform a determination by using a size one step greater than the derived virtual cell size as a reference. In the case when it is determined that the size of the circumscribed rectangle is smaller than the virtual cell size in this manner, the processing proceeds to step 516 and the print data generation processing for graphics corresponding to a character is performed. On the other hand, in the case when it is determined that the size of the circumscribed rectangle is greater than or equal to the virtual cell size, the processing proceeds to step 517, and the print data generation processing for normal graphics is performed.

At step 525, whether or not there is a drawing element for which the processing has not been performed yet within the drawing data is determined. In the case when there is a drawing element for which the processing has not been performed yet, the processing returns to step 504, and the next drawing element is determined to be the drawing element of interest, and thus, the processing is continued. On the other hand, in the case when the processing has been completed for all of the drawing elements within the drawing data, the processing proceeds to step 526. In the case when the drawing data consists of only the drawing elements with the graphics attribute, there should be no drawing element for which the processing has not been performed yet in this stage, and therefore, the processing proceeds to step 526, without exception.

At step 526, the generated print data (e.g., PDL data) is sent to the printer 420. In the case when the drawing data includes a plurality of pages, the same processing is repeated the number of times corresponding to the number of pages.

The above is the contents of the processing to convert drawing data generated by an application into print data for the printer 420.

According to the present embodiment, it is made possible to appropriately detect a character by the path drawing specified by the drawing element with the graphics attribute as a text. Due to this, it is made possible to perform optimum image processing for character outputting even for a character by the path drawing, and therefore, it is possible to perform printing of higher quality. Further, even in the case of drawing data in which the text attribute and the graphics attribute exist mixedly for characters, it is made possible to perform the image processing with the same contents for characters regardless of the attribute, and therefore, it is possible to prevent such trouble that the tint, the density, etc., appear to be different from character to character.

Other Embodiments

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present invention, it is possible to perform optimum image processing for character outputting even for a character drawn in the form of a path (graphics attribute). Due to this, it is possible to implement printing of higher quality. Further, even in the case when different attributes (drawing forms) exist mixedly for characters, it is possible to perform the same image processing as a character, and therefore, it is made possible to prevent trouble that the tint, the density, etc., appear to be different.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that converts drawing data generated by an application program into print data to be used for printing with a printing apparatus, the image processing apparatus comprising:
   (A) a memory configured to store a program; and
   (B) a processor configured to execute the program to perform:
     (a) determining, among drawing elements included in the drawing data, a drawing element that has a graphics attribute and that corresponds to a character drawn with path coordinates;
     (b) converting the drawing data into the print data by performing image processing suitable to each attribute for the drawing elements included in the drawing data, wherein image processing suitable to a text attribute is performed for (i) the drawing element that has the text attribute, and (ii) a drawing element that is determined to be the drawing element that has the graphics attribute and that corresponds to the character drawn with the path coordinates, and wherein image processing suitable to the graphics attribute is performed for the drawing element that is determined to be the drawing element that has the graphics attribute and that does not correspond to the character drawn with the path coordinates; and
     (c) sending converted print data to the printing apparatus so that the printing apparatus executes the printing using the converted print data.

2. The image processing apparatus according to claim 1, wherein the drawing element corresponding to the character drawn with the path coordinates is determined by deriving a circumscribed rectangle of graphics drawn with the path coordinates and by using information on the derived circumscribed rectangle.

3. The image processing apparatus according to claim 2, wherein the drawing element having the graphics attribute is determined to correspond to the character drawn with the path coordinates in a case when a predetermined one side of the derived circumscribed rectangle is less than or equal to a predetermined distance from a baseline obtained from font information included in an adjacent drawing element with the text attribute.

4. The image processing apparatus according to claim 2, wherein the drawing element having the graphics attribute is determined to correspond to the character drawn with the path coordinates in a case when the side corresponding to the height of the derived circumscribed rectangle is within a cell height range obtained from font information included in an adjacent drawing element having the text attribute.

5. The image processing apparatus according to claim 2, wherein the drawing element having the graphics attribute is determined to correspond to the character in a case when the derived circumscribed rectangle is located between characters relating to the drawing elements having the text attribute.

6. The image processing apparatus according to claim 1, wherein the determining is performed in a case when adjacent drawing elements located before and after the drawing element having the graphics attribute are the drawing elements with the text attribute.

7. The image processing apparatus according to claim 1, wherein the determining is performed in a case when a color of the drawing element having the graphics attribute and a color of an adjacent drawing element having the text attribute are the same, the adjacent drawing element being adjacent to the drawing element having the graphics attribute.

8. The image processing apparatus according to claim 1, wherein the processor executes the program to further perform:
   (d) deriving circumscribed rectangles for graphics specified by the path coordinates in a plurality of drawing elements in a case when all of the plurality of drawing elements included in the drawing data have the graphics attribute,
   wherein the plurality of drawing elements is determined to be the drawing elements corresponding to a character in a case when the derived circumscribed rectangles are located side by side.

9. The image processing apparatus according to claim 8, wherein the processor executes the program to further perform:
   (e) finding an interval between reference positions of the circumscribed rectangles derived for the graphics; and
   (f) deriving a virtual cell size having a side, the length of which is the found interval,
   wherein the plurality of drawing elements is determined to be the drawing elements corresponding to the character in a case when the size of the circumscribed rectangles derived for the graphics is smaller than the virtual cell size.

10. The image processing apparatus according to claim 1, wherein the image processing suitable to the text attribute includes a dither processing in which priority to resolution is applied to the kind of dither and a color matching processing in which priority to saturation is applied to the rendering intent.

11. An image processing method of converting drawing data generated by an application program into print data to be used for printing with a printing apparatus, the method comprising the steps of:
   determining a drawing element having a graphics attribute that corresponds to the character drawn with path coordinates among drawing elements included in the drawing data;
   converting the drawing data into the print data by performing image processing suitable to each attribute for the drawing elements included in the drawing data, wherein the image processing suitable to a text attribute is performed (i) for the drawing element that has the text attribute, and (ii) the drawing element that is determined as the drawing element that has the graphics attribute and that corresponds to the character drawn with the path coordinates, and wherein image processing suitable to the graphics attribute is performed for the drawing element that is determined as the drawing element that has the graphics attribute and that does not correspond to the character drawn with the path coordinates; and sending converted print data to the printing apparatus so that the printing apparatus executes the printing using the converted print data.

12. A non-transitory computer readable storage medium storing a program for causing a computer to perform steps of:

determining, among drawing elements included in drawing data generated by an application program, a drawing element that has a graphics attribute and that corresponds to a character drawn with path coordinates;

converting the drawing data into print data by performing image processing suitable to each attribute for the drawing elements included in the drawing data, wherein image processing suitable to a text attribute is performed (i) for the drawing element that has the text attribute, and (ii) for the drawing element that is determined as the drawing element that has the graphics attribute and the corresponds to the character drawn with path coordinates, and wherein image processing suitable to the graphics attribute is performed for the drawing element that is determined as the drawing element that has the graphics attribute and that does not correspond to the character drawn with the path coordinates; and sending converted print data to a printing apparatus so that the printing apparatus executes a printing using the converted print data.

* * * * *